(12) United States Patent
Suzuki et al.

(10) Patent No.: US 7,398,795 B2
(45) Date of Patent: Jul. 15, 2008

(54) EXCESS FLOW VALVE

(75) Inventors: Hiroaki Suzuki, Nagoya (JP); Toshihiko Shima, Okazaki (JP); Yoshiyuki Takeuchi, Gomagoori (JP)

(73) Assignee: Toyoda Koki Kabushiki Kaisha, Kariya-Shi, Aichi-Ken (JP)

( * ) Notice: Subject to any disclaimer, the term of this patent is extended or adjusted under 35 U.S.C. 154(b) by 317 days.

(21) Appl. No.: 11/085,927

(22) Filed: Mar. 21, 2005

(65) Prior Publication Data

US 2005/0217729 A1    Oct. 6, 2005

(30) Foreign Application Priority Data

Apr. 1, 2004    (JP)    ............... 2004-108671

(51) Int. Cl.
*F16K 31/18*    (2006.01)
(52) U.S. Cl. ............... 137/487.5; 137/460; 137/529; 137/517; 251/129.02
(58) Field of Classification Search ............... 137/12, 137/460, 487.5, 517, 529; 251/129.02, 129.15
See application file for complete search history.

(56) References Cited

U.S. PATENT DOCUMENTS

| | | | | |
|---|---|---|---|---|
| 3,628,563 A | * | 12/1971 | Tomita | ............... 137/460 |
| 3,952,759 A | * | 4/1976 | Ottenstein | ............... 137/12 |
| 5,152,309 A | * | 10/1992 | Twerdochlib et al. | ............ 137/8 |
| 5,287,884 A | * | 2/1994 | Cohen | ............... 137/486 |
| 5,813,429 A | | 9/1998 | Ohtaka et al. | |
| 6,209,576 B1 | * | 4/2001 | Davis | ............... 137/487.5 |
| 6,634,373 B1 | * | 10/2003 | Nilsen et al. | ............... 137/12 |
| 6,652,240 B2 | * | 11/2003 | Wichert | ............... 417/53 |
| 6,938,637 B2 | * | 9/2005 | McGill et al. | ............... 137/39 |
| 2002/0014277 A1 | | 2/2002 | Togasawa et al. | |
| 2002/0029804 A1 | | 3/2002 | Liorati et al. | |
| 2002/0113219 A1 | | 8/2002 | Rembold et al. | |

OTHER PUBLICATIONS

European Search Report for EP 05 00 6448 dated Jul. 19, 2005.

* cited by examiner

*Primary Examiner*—Kevin L Lee
(74) *Attorney, Agent, or Firm*—Darby & Darby P.C.

(57) ABSTRACT

An excess flow valve includes: a valve that opens and closes a flow path; a solenoid that keeps the valve in an opened state; a pressure detector detecting the primary-side pressure of the valve; and a controller controlling current flow to the solenoid based on pressure detected by the pressure detector so that the valve is closed when the flow rate supplied to the valve is at or more than a predetermined amount. The excess flow valve can be used in a wide variety of applications and prevents a flow of fluid at or greater than a desired flow rate even if the primary-side supply pressure varies.

6 Claims, 3 Drawing Sheets

EXCESS FLOW VALVE

INCORPORATION BY REFERENCE

The present application claims priority under 35 U.S.C. §119 to Japanese Patent Application No. 2004-108671 filed on Apr. 1, 2004. The content of the application is incorporated herein by reference in its entirety.

FIELD OF THE INVENTION

The present invention relates to an excess flow valve. More specifically, the present invention relates to an excess flow valve that can prevent a flow of a fluid that is greater than a predetermined value even if the pressure on the primary side varies.

BACKGROUND OF THE INVENTION

Conventionally, when using a pressurized fluid supplied from a high-pressure tank or another source, an excess flow valve is used to prevent the fluid from damaging devices that it operates and to prevent fluid from flowing out if the devices are damaged. This excess flow valve shuts off its flow path when it receives a flow that reaches or exceeds a predetermined flow or when there is an irregular drop in the pressure on the downstream side of the valve.

FIG. 3 shows an example of a conventional excess flow valve. An excess flow valve 100 includes: a valve body 102 that opens and closes a flow path 101; a spring 103 that keeps the valve body 102 in an opened state; and a valve seat 104 on which the valve body 102 is seated. A housing 105 supports the valve body 102 and the spring 103.

The valve body 102 includes: a disc-shaped base end section 106; a cylindrical guide 107 that extends from the base end section 106 to the right in the figure and that has a diameter smaller than that of the base end section 106; an opening 108 formed at the outer perimeter surface of the guide section 107; and multiple projections 109 projected to the left from the base end section 106.

In the normal state of the excess flow valve 100, the biasing force from the spring 103 keeps the valve body 102 abutted against the left-side end surface of a valve body housing section 110 in the housing 105. The fluid passes from the left side in the figure (primary side) to the right side (secondary side) through the gap formed by the projections 109 and the opening 108 of the guide 107.

With this excess flow valve 100, when the fluid from the primary side has a flow that reaches or exceeds a predetermined amount, the force (flow velocity) of the flow causes the valve body 102 to move to the right in the figure against the biasing force from the spring 103 and to become seated on the valve seat 104, thus blocking the flow path 101 and shutting off the excessive flow.

Under normal conditions, the valve body 102 is kept in an open state by the biasing force from the spring 103 with almost no change in pressure between the primary side and secondary side of the valve body 102. If, however, for some reason the pressure on the secondary side drops to or below a predetermined pressure, the valve body 102 moves to the right in the figure in opposition to the biasing force from the spring 103 and is seated on the valve seat 104, thus blocking the flow path 101.

The background technology described above covers general subject matter, and the present applicant has not, at the time of this application, found any particular document that describes this background technology.

However, with the conventional excess flow valve 100, if the biasing force from the spring 103 stays constant, the flow of fluid that would activate and close the valve body 102 would vary depending on the pressure on the primary side. In general, with fluids, the relationship between pressure and flow velocity is such that, when the flow rate is constant, an increase in pressure results in a decrease in the flow velocity. With the valve body 102, operation is based on the flow rate, and this flow rate can be expressed as cross-sectional area x (multiplied by) flow velocity. As a result, when the primary-side pressure increases, the flow velocity decreases even if the flow rate is the same and less force acts on the valve body 102, keeping it open. To make the valve body 102 close while keeping the pressure unchanged requires increasing the flow velocity. This means that the higher the primary-side pressure is, the flow must necessarily increase.

Because of this, the conventional excess flow valve 100 requires the selection and mounting of a spring that has a biasing force that closes the valve at the desired flow rate for the particular primary-side pressure to be used. This is inconvenient and prevents the valves from being used in general-purpose devices.

In addition, if the valve is used in something where the primary-side pressure changes, the flow rate that closes the valve body 102 would change depending on the primary-side pressure. This makes it impossible to keep the flow rate consistently below a predetermined value.

If the biasing force of the spring 103 in the excess flow valve 100 is set so that the valve closes at a desired flow rate under a high primary pressure, a drop in the primary-side pressure would result in the valve closing at a flow rate that is lower than the desired flow rate, thus preventing the flow rate needed on the secondary side from being provided.

SUMMARY OF THE INVENTION

The object of the present invention is to overcome the problems described above, to prevent a flow of fluid that is at or above a desired flow rate, and to provide an excess flow valve for a general-purpose device.

In order to achieve the object described above, the excess flow valve according to the present invention includes: a valve body that opens and closes a flow path; a positioner maintaining the valve body in an open state; a pressure detector detecting pressure on a primary side of the valve body; and a controller controlling the positioner based on pressure detected by the pressure detector so that the valve body is in a closed state when a flow rate supplied to the valve body is greater than a predetermined value.

A positioner referred to here can be, for example, a device that uses the biasing force from an elastic body such as a spring or rubber, a device that uses magnetic force such as a permanent magnet or an electromagnet, or the like. A controller can be, for example, a controller controlling compression of an elastic body, a controller controlling the position of a magnet, a controller controlling power applied to an electromagnet, or the like. In an embodiment, it is desirable for the controller to lower the magnetic force or biasing force when the primary-side pressure increases and to increase the magnetic force or biasing force when the primary-side pressure decreases.

With the excess flow valve of the present invention, the controller controls the positioner, which keeps the valve body in an open state, according to the primary-side pressure detected by the pressure detector so that the flow rate is no more than a predetermined value. As a result, the need to use springs with different biasing forces depending on the primary-side pressure, as in the conventional excess flow valve, is eliminated, and the excess flow valve can be a more general-purpose device.

Also, with the present invention, if the primary-side fluid supply pressure varies, the positioner can be controlled in accordance with that pressure. Thus, the valve body can be consistently closed when the flow rate is at or above a desired value. Thus, the device is suitable for use in applications where the primary-side supply pressure varies. Examples of applications where the supply pressure varies include cases where gas or the like is stored in a compressed state in a tank, and cases where the supply of fluids stored in a tank is governed by the weight of the fluid itself.

Furthermore, since the valve can be consistently closed if the flow rate is at or above a desired value, devices connected to the secondary side are prevented from being damaged or producing inadequate performance due to insufficient flow rate.

According to another aspect, an excess flow valve according to the present invention can be formed as described above wherein, additionally, the positioner includes a solenoid and magnetic force generated by application of power to the solenoid keeps the valve body in an open state.

Since a solenoid is used in the positioner in this invention, the magnetic force that maintains the valve body can be changed easily by controlling the power to the solenoid. Thus, the excess flow valve can be formed with a simple structure since there is no need to provide a mechanical mechanism. Instead of using power applied to the solenoid to control the solenoid, it is also possible to control the position of the solenoid to change the magnetic force that maintains the valve body.

According to another aspect, an excess flow valve according to the present invention can be formed as described above wherein, additionally, the controller controls a current or potential applied to the solenoid to control the positioner.

With this invention, the current or potential applied to the solenoid is controlled to control the magnetic force that maintains the valve body. Since the current or potential can be controlled easily, the magnetic force can be controlled easily, thus allowing a simple and inexpensive excess flow valve.

With the present invention described above, an excess flow valve can be provided that can be used as a general-purpose device and that prevents a flow rate for a fluid at or above a desired value even if the primary-side supply pressure changes.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
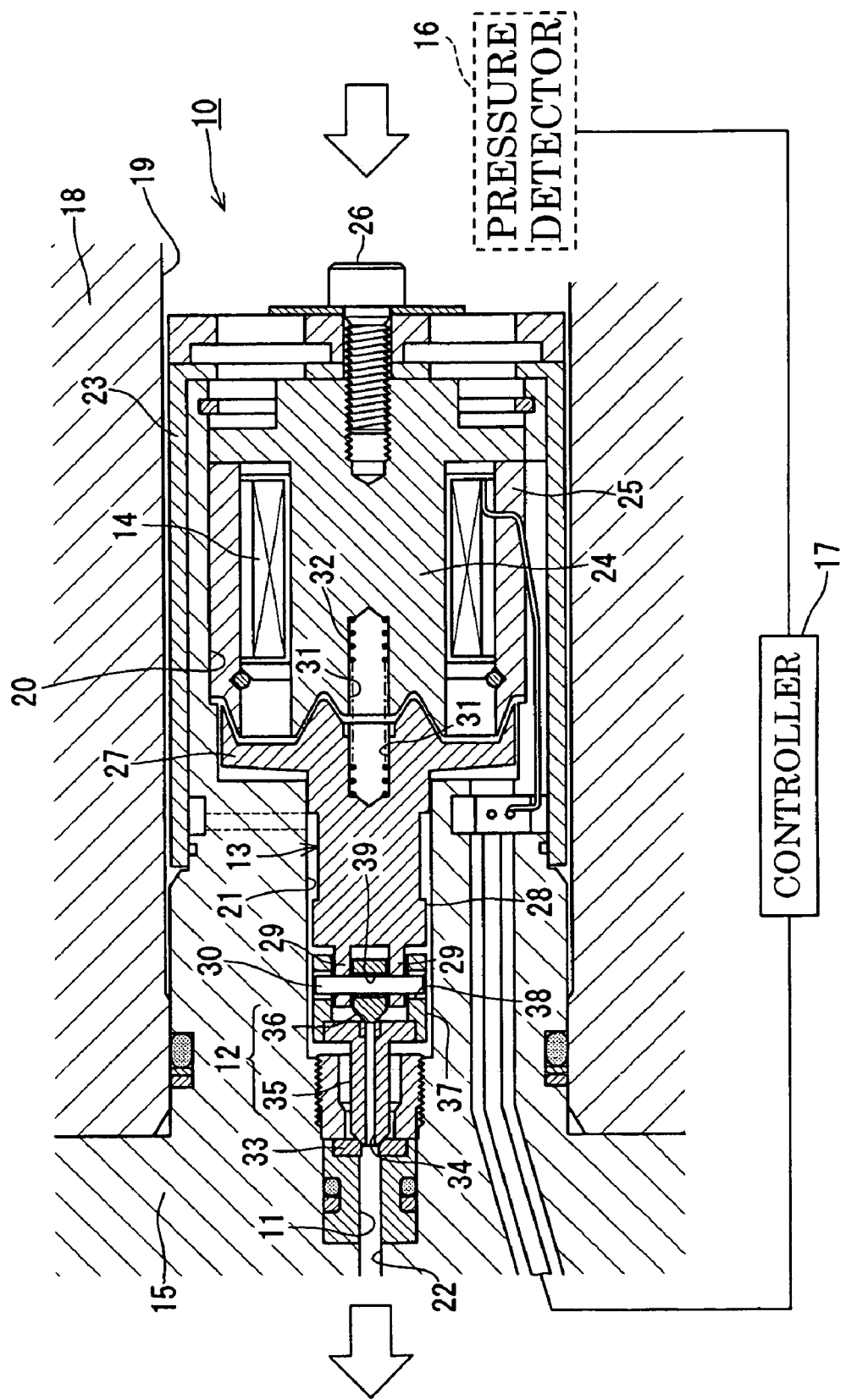
FIG. 1 is a cross-sectional view showing the functional structure of an excess flow valve according to an embodiment of the present invention.

An embodiment of an excess flow valve according to the present invention will be described, with references to the figures. FIG. 1 is a cross-sectional view showing the functional structure of an excess flow valve according to an embodiment of the present invention. The excess flow valve in this example is used to stop the flow path when a high-pressure tank holding pressurized (approximately 70 MPa in this example) hydrogen gas supplies an excess flow of pressurized fluid or when the pressure on the secondary side drops to or below a predetermined pressure.

As shown in FIG. 1, an excess flow valve 10 includes a valve body 12 that opens and closes a flow path 11 of a pressurized fluid; a solenoid 14 that keeps the valve body 12 in an opened state by way of a plunger 13; a casing 15 that includes the flow path 11 and that supports the valve body 12, the plunger 13, the solenoid 14, and the like; a pressure detector 16 detecting the pressure on the primary side of the valve body 12; and a controller 17 controlling the power to the solenoid 14 based on the pressure detected by the pressure detector 16. A first end (to the right in the figure) of the casing 15 is inserted in an air-tight manner in an attachment hole 19 formed on a high-pressure tank 18 holding a pressurized fluid. A securing tool not shown in the figure secures the second end of the casing 15 to the tank 18.

The first end of the casing 15 is formed in a cylindrical shape. The inner surface thereof is formed with a large diameter, extends to the left in the figure, and includes: a solenoid housing section 20 housing the solenoid 14; a valve body housing section 21 continuous with and with a smaller diameter than the solenoid housing section 20 housing the valve body 12; and a path 22 continuous with and with a smaller diameter than the valve body housing section 21. Also, a cover 23 closes off a section of the open end of the solenoid housing section 20 and is fitted from the outside to the outer perimeter of the first end of the casing 15.

The solenoid 14 is formed as a cylindrical coil. A core 24 is inserted into the solenoid 14, and outer cylinder member 25 is mounted to the outside of the solenoid 14. The solenoid 14 is assembled integrally with the core 24 and the outer cylinder member 25 and is inserted into the solenoid housing section 20 in this state. A bolt 26 is used to secure the solenoid 14 to the cover 23, i.e., to the casing 15. This assembly which includes the solenoid 14 is not assembled in an air-tight manner, and it is possible for pressurized fluid to flow through it.

The plunger 13, disposed downstream (to the left in the figure) from the solenoid 14, includes: a large-diameter section 27 positioned in the solenoid housing section 20; and a small-diameter section 28 extending from the large-diameter section 27 into the valve body housing section 21. A pair of support pieces 29 are projected in the direction of the axis of the plunger 13 from the end of the plunger 13. A pin 30 is supported perpendicular to the axis of the plunger 13 by the pair of support pieces 29.

The plunger 13 is loosely fitted so that it can slide along its axial direction. Holes 31 are formed facing each other and having a predetermined depth at roughly the centers of the facing surfaces of the plunger 13 and the core 24. A spring 32 is housed in the holes 31, and this spring 32 biases the plunger 13 and the core 24 in opposite directions from each other. More specifically, the spring 32 biases the plunger 13 to the left in the figure. In this example, the solenoid 14 and the spring 32 provide a positioner in the present invention.

The valve body 12 includes: a main valve body 35, which is seated on a main valve seat 33 disposed in the valve body housing section 21 and includes a pilot hole 34 that extends all the way through in the axial direction; and a pilot valve 36 that opens and closes the pilot hole 34 of the main valve body 35. A cylindrical section 37, large enough to house the pilot valve 36 and the support piece 29 at the end of the plunger 13, is formed at the end of the main valve body 35 with the pilot valve 36. A slot 38 extending axially is formed on the cylindrical section 37 for insertion of the ends of the pin 30 of the plunger 13. Also, the pilot valve 36 is disposed between the pair of support pieces 29 at the end of the plunger 13 and is formed with an axially extending slot 39 used for insertion of pin 30.

In this example, the pin 30 at the end of the plunger 13 is loosely fitted into the slot 38 of the main valve body 35 and the slot 39 of the pilot valve 36. Also, the length of the slot 39 of the pilot valve 36 is shorter than the length of the slot 38 of the main valve body 35. As a result, when the plunger 13 moves to the right from the state shown in FIG. 1, the pilot valve 36 first moves to the right and then the main valve body 35 moves to the right.

With the valve body 12 of this example as described above, even if there is a large pressure difference between the primary side and the secondary side, the pilot valve 36 first eliminates the pressure difference between the primary side and the secondary side and reduces the pressure difference applied to the main valve body 35 before the main valve body 35 is moved to an open state. Thus, the main valve body 35 and the pilot valve 36 can be moved even if the magnetic force from the solenoid 14 is relatively weak. As a result, energy-conserving and compact designs can be provided, e.g., the solenoid 14 can be operated with low power, and the solenoid 14 can be small.

Next, the operation of the excess flow valve 10 according to this example will be described in further detail. In the state shown in FIG. 1, the flow path 11 is shown in a closed state. In this state, the main valve body 35 is biased toward the main valve seat 33 by the spring 32 by way of the pilot valve 36 and the plunger 13, and is also pushed toward the main valve seat 33 by the pressure difference caused by the primary-side pressure being lower than the secondary-side pressure.

From this state, when power is applied to the solenoid 14 from the controller 17, a magnetic force (pulling force) is generated so that the plunger 13 moves to the right in the figure, in opposition to the biasing force from the spring 32. Next, the movement of the plunger 13 first causes the pilot valve 36 to move to the right. The pilot valve 36 opens the pilot hole 34 of the main valve body 35, and the pressures on the primary side and the secondary side of the main valve body 35 become roughly the same. Then, the push that was applied to the main valve body 35 due to the pressure difference is decreased, resulting in the movement of the plunger 13 and the rightward movement of the main valve body 35, opening the flow path 11.

Next, the controller 17 sends a predetermined amount of power to the solenoid 14 based on the pressure detected by the pressure detector 16. Control operations are performed here using potential or current. As a result, a predetermined amount of magnetic force is generated by the solenoid 14, and this magnetic force keeps the plunger 13 drawn to the right in the figure. In this state, pressurized fluid can pass through the excess flow valve 10. When pressurized fluid that is at or more than a predetermined flow rate is supplied from the primary side, the force of the flow resulting from the flow velocity of the pressurized fluid is applied to the plunger 13, the main valve body 35, and the like. This causes the plunger 13, i.e., the main valve body 35, to move to the left in opposition to the magnetic force from the solenoid 14, closing the flow path 11.

When the flow path 11 is in the open state and the secondary pressure suddenly drops to or below a predetermined pressure, a pressure difference is created between an upstream side and a downstream side of the main valve body 35 and the plunger 13. This pressure difference causes the main valve body 35 to move to the left, in opposition to the magnetic force from the solenoid 14, and the flow path 11 is closed.

The flow path 11 is then opened by increasing the power to the solenoid 14 and performing the operations described above.

As the pressurized fluid in the tank 18 is used, the pressure decreases. Since the primary-side pressure decreases, the controller 17 controls the power to the solenoid 14 based on the pressure detected by the pressure detector 16 so that the flow rate never reaches or exceeds a fixed amount. In this example, power is reduced at high pressures so that the magnetic force is decreased, and power is increased at low pressures so that the magnetic force is increased.

With the excess flow valve 10 according to this embodiment, there is no need to replace springs with different biasing forces depending on the primary-side pressure, as was necessary in the conventional excess flow valve 100. This allows the excess flow valve 10 to be a more general-purpose device. Also, since power to the solenoid 14 can be controlled easily, the magnetic force can also be easily controlled, making it possible to provide a simple and inexpensive device. Furthermore, the valve body 12 can be closed when the flow rate is at or exceeds a desired value. This makes it possible to prevent damage to devices connected to the secondary side and to prevent such devices from working insufficiently due to a small flow rate.

The embodiment described above is the preferred embodiment of the present invention, but the present invention is not restricted to this embodiment. Various modifications may be effected without departing from the spirit of the present invention.

More specifically, in the excess flow valve 10 described above, the valve body 12 includes the main valve body 35 and the pilot valve 36. However, it is possible to just have a main valve body or a pilot valve only.

Figure 2:
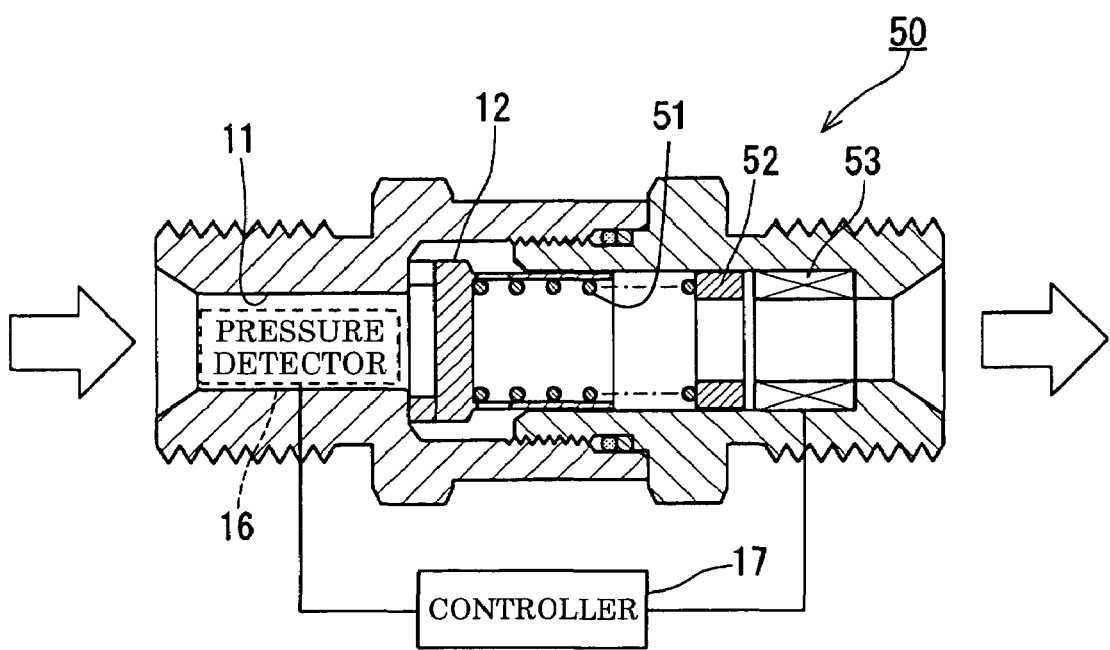
FIG. 2 is a cross-sectional view showing an excess flow valve different from the one shown in FIG. 1.
Figure 3:
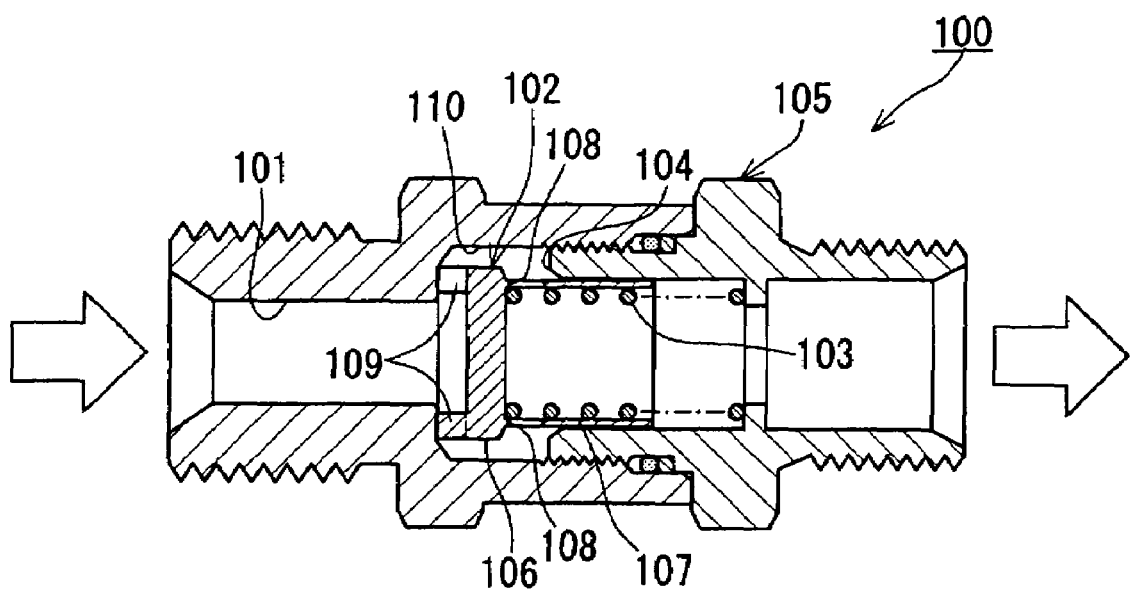
FIG. 3 is a cross-sectional view showing a conventional excess flow valve.

Also, regarding the magnetic force from the solenoid 14, only the attractive force was described. The present invention is not restricted to this, however, and repelling force can be used as well. For example, it is possible to use the excess flow valve shown in FIG. 2. Elements similar to those of the embodiment described above are assigned like numerals and corresponding descriptions are omitted. In this excess flow valve 50, the present invention is implemented in the conventional excess flow valve 100 shown in FIG. 3.

With this excess flow valve 50, a spring 51 that keeps the valve body 12 in an open state biases the valve body 12 to the left in the figure (primary side). The end of the spring 51 opposite from the valve body 12 abuts the plunger 52. A solenoid 53 is disposed to the right of the plunger 52. When power is applied to the solenoid 53 from the controller 17, the plunger 52 is repulsed by the magnetic force from the solenoid 53 so that the spring 51 is pushed to the left. As a result, the biasing force from the spring 51 can be changed. Advantages similar to those described for the embodiment above can be provided by changing the biasing force of the spring 51 based on pressure detected by the pressure detector 16.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An excess flow valve comprising:
a valve body that opens and closes a flow path;
a positioner comprising a biasing member for generating a biasing force and a solenoid; wherein
a magnetic force generated by application of power to said solenoid acts on the biasing member to keep said valve body in an open state;
a pressure detector detecting a pressure on a primary side of said valve body; and
a controller controlling said positioner based on said pressure detected by said pressure detector so that said valve body is in a closed state when a flow rate of fluid supplied to said valve body is greater than a predetermined value.

2. An excess flow valve comprising:
a valve body that opens and closes a flow path;
a positioner comprising a biasing member; wherein
a biasing force generated by said biasing member keeps said valve body in an open state;
a pressure detector detecting a pressure on a primary side of said valve body;
a controller controlling said positioner based on said pressure detected by said pressure detector so that said valve body is in a closed state when a flow rate of fluid supplied to said valve body is greater than a predetermined value; and, wherein said controller decreases said biasing force when a pressure difference between a secondary side pressure and said primary side pressure reaches a predetermined limit.

3. An excess flow valve comprising:
a valve body that opens and closes a flow path;
a positioner comprising a biasing member; wherein
a biasing force generated by said biasing member keeps said valve body in an open state;
a pressure detector detecting a pressure on a primary side of said valve body;
a controller controlling said positioner based on said pressure detected by said pressure detector so that said valve body is in a closed state when a flow rate of fluid supplied to said valve body is greater than a predetermined value; and wherein said biasing member comprises a spring that applies said biasing force on said valve body.

4. An excess flow valve comprising:
a valve body that opens and closes a flow path;
a solenoid adapted to generate a magnetic force by the application of power to said solenoid for maintaining said valve body in an open state;
means for detecting a pressure on a primary side of said valve body; and
means for controlling said solenoid for maintaining said valve body in said open state based on said pressure detected by said means for detecting said pressure so that said valve body is in a closed state when a flow rate of fluid supplied to said valve body is greater than a predetermined value, wherein, when said flow rate reaches said predetermined value, said solenoid for maintaining said valve body in said open state moves the valve body toward said closed state, with counteracting said magnetic force generated by said solenoid.

5. An excess flow valve comprising:
a valve body that opens and closes a flow path;
a solenoid adapted to generate a magnetic force by the application of power to said solenoid for maintaining said valve body in an open state;
means for detecting a pressure on a primary side of said valve body; and means for controlling said solenoid for maintaining said valve body in said open state based on said pressure detected by said means for detecting said pressure so that said valve body is in a closed state when a flow rate of fluid supplied to said valve body is greater than a predetermined value wherein, when a pressure difference between a secondary side pressure and said primary side pressure reaches a predetermined limit, said solenoid for maintaining said valve body in said open state moves the valve body toward said closed state, with counteracting said magnetic force generated by said solenoid.

6. An excess flow valve comprising:
a valve body that opens and closes a flow path;
a biasing member and a solenoid for maintaining said valve body in an open state; wherein
a biasing force generated by said biasing member keeps said valve body in said open state, and magnetic force generated by application of power to said solenoid acts on the biasing member to keep said valve body in said open state;
means for detecting a pressure on a primary side of said valve body; and
means for controlling said solenoid based on said pressure detected by said means for detecting said pressure so that said valve body is in a closed state when a flow rate of fluid supplied to said valve body is greater than a predetermined value.

* * * * *